United States Patent
Mori et al.

(10) Patent No.: US 10,816,714 B2
(45) Date of Patent: Oct. 27, 2020

(54) LIGHT GUIDE ELEMENT, LIGHT GUIDE UNIT AND ILLUMINATION DEVICE

(71) Applicant: Omron Corporation, Kyoto (JP)

(72) Inventors: Yuto Mori, Kyoto (JP); Gouo Kurata, Kyoto (JP); Norikazu Kitamura, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/326,822

(22) PCT Filed: Aug. 22, 2017

(86) PCT No.: PCT/JP2017/029992
§ 371 (c)(1),
(2) Date: Feb. 20, 2019

(87) PCT Pub. No.: WO2018/061534
PCT Pub. Date: Apr. 5, 2018

(65) Prior Publication Data
US 2019/0196090 A1    Jun. 27, 2019

(30) Foreign Application Priority Data
Sep. 29, 2016    (JP) .................................. 2016-191644

(51) Int. Cl.
*F21V 8/00*    (2006.01)
*F21S 2/00*    (2016.01)
(Continued)

(52) U.S. Cl.
CPC .............. *G02B 6/0028* (2013.01); *F21S 2/00* (2013.01); *F21S 41/00* (2018.01); *F21S 43/00* (2018.01); *F21S 45/00* (2018.01); *G02B 6/0068* (2013.01)

(58) Field of Classification Search
None
See application file for complete search history.

(56) References Cited

U.S. PATENT DOCUMENTS 6,241,358 B1    6/2001    Higuchi et al.
2004/0130882 A1    7/2004    Hara et al.
(Continued)

FOREIGN PATENT DOCUMENTS

CN    103591515 A    2/2014
DE    102010012634 A1    9/2011
(Continued)

OTHER PUBLICATIONS

International Search Report issued in Application No. PCT/JP2017/029992, dated Oct. 31, 2017 (2 pages).
(Continued)

*Primary Examiner* — Britt D Hanley
(74) *Attorney, Agent, or Firm* — Osha Liang LLP

(57) ABSTRACT

A light guide element includes: an incidence surface wherefrom light enters from a light source; a first reflection surface configured to totally reflect at least a portion of the light entering from the incidence surface; a second reflection surface configured to totally reflect at least a portion of the light totally reflected by the first reflection surface as parallel light; and an emission surface configured to emit the parallel light totally reflected by the second reflection surface.

18 Claims, 31 Drawing Sheets

(51) Int. Cl.
*F21S 43/00* (2018.01)
*F21S 41/00* (2018.01)
*F21S 45/00* (2018.01)

(56) References Cited

U.S. PATENT DOCUMENTS

| | | |
|---|---|---|
| 2005/0162857 A1 | 7/2005 | Tsukamoto |
| 2005/0180158 A1 | 8/2005 | Komatsu |
| 2005/0180166 A1 | 8/2005 | Hara et al. |
| 2005/0180719 A1 | 8/2005 | Hara et al. |
| 2005/0180720 A1 | 8/2005 | Hara et al. |
| 2006/0087860 A1 | 4/2006 | Ishida |
| 2006/0285347 A1 | 12/2006 | Okada |
| 2008/0212339 A1 | 9/2008 | Hara et al. |
| 2011/0085343 A1 | 4/2011 | Ohno et al. |
| 2011/0286229 A1 | 11/2011 | Ohno |
| 2013/0135887 A1 | 5/2013 | Otani et al. |
| 2015/0285981 A1* | 10/2015 | Park ................ G02B 6/0025 349/64 |
| 2017/0211771 A1 | 7/2017 | Nishimura et al. |
| 2019/0301697 A1 | 10/2019 | Nishimura et al. |

FOREIGN PATENT DOCUMENTS

| | | |
|---|---|---|
| DE | 102011018508 A1 | 10/2012 |
| DE | 102011089575 B3 | 6/2013 |
| DE | 102012112125 A1 | 6/2014 |
| DE | 10 2013 222 794 A1 | 5/2015 |
| EP | 2161494 A1 | 3/2010 |
| JP | H11-288611 A | 10/1999 |
| JP | 2005-190669 A | 7/2005 |
| JP | 2005-228502 A | 8/2005 |
| JP | 2006-127856 A | 5/2006 |
| JP | 2006-324013 A | 11/2006 |
| JP | 2007-213951 A | 8/2007 |
| JP | 2008-41557 A | 2/2008 |
| JP | 2009-135116 A | 6/2009 |
| JP | 2011-82066 A | 4/2011 |
| JP | 2011-86489 A | 4/2011 |
| JP | 2011-86489 A * | 4/2011 |
| JP | 2011-243521 A | 12/2011 |
| JP | 2012-129002 A | 7/2012 |
| JP | 2013-137979 A | 7/2013 |
| JP | 2015-103328 A | 6/2015 |
| JP | 2016-004607 A | 1/2016 |

OTHER PUBLICATIONS

Written Opinion issued in International Application No. PCT/JP2017/029992, dated Oct. 31, 2017 (10 pages).
Office Action issued in the counterpart Japanese Patent Application No. 2016-191644, dated Nov. 5, 2019 (12 pages).
Office Action in counterpart Japanese Patent Application No. 2016-191644, dated Mar. 3, 2020 (12 pages).
Office Action in counterpart Germans Patent Application No. 112017004923.7, dated May 13, 2020 (9 pages).
Office Action in counterpart Chinese Patent Application No. 2017800494624 dated Aug. 13, 2020 (18 pages).

* cited by examiner

LIGHT GUIDE ELEMENT, LIGHT GUIDE UNIT AND ILLUMINATION DEVICE

BACKGROUND

Field

The present invention relates to a light guide element and a light guide unit for emitting parallel light, and to an illumination device provided with said light guide unit.

Related Art

A stereoscopic display device that shows a three-dimensional image without the need for viewing glasses is known. This kind of stereoscopic display device is equipped with a light guide plate, an illumination device, a left-eye display pattern, and a right-eye display pattern. The illumination device is located at an end part of the light guide plate, and irradiates the light guide plate with light. The left-eye display pattern is a plurality of first prisms formed on the rear surface of the light guide plate; and the right-eye display pattern is a plurality of second prisms formed on the rear surface of the light guide plate. With this configuration the light from the illumination device reflects from the plurality of first prisms and second prisms whereby a left-eye image and a right-eye image are presented toward the front surface of the light guide plate. An observer thus perceives a three-dimensional image.

Incidentally, the stereoscopic display device requires an illumination device capable of irradiating the light guide plate with parallel light in order to present a large three-dimensional image via the above means. For instance, Japanese Patent Publication No. 2005-228502 (published Aug. 25, 2005); Japanese Patent Publication No. 2011-243521 (published Dec. 1, 2011); Japanese Patent Publication No. 2005-190669 (published Jul. 15, 2005); and Japanese Patent Publication No. 2013-137979 (published Jul. 11, 2013) describe an illumination device for emitting such kind of parallel light.

The illumination device disclosed in JP 2005-228502 A (an automotive lighting unit) uses a parabolic post provided to the light guide element to cause light emitted from the light source to be totally reflected once; hereby parallel light radiates from the 2005-228502 A requires that the light source is placed on the focal line in the plane of the parabolic post. Therefore, this requires a greater distance between the light source and the emission surface to secure a certain width for the optical path of light being emitted from the device. As a result, the illumination device has a larger footprint.

JP 2011-243521 A, JP 2005-190669 A, and JP 2013-137979 A propose solutions to address this issue. The illumination devices disclosed in JP 2011-243521 A, JP 2005-190669 A, and JP 2013-137979 A are configured so that the light guide element includes two reflection surfaces that each reflect light emitted from the light source one time (for a total of two reflections; thus, this secures the width of the optical path of light being emitted and allows parallel light to radiate from the illumination surface without increasing the distance between the light source and the emission surface).

SUMMARY

Despite this, the illumination devices described in Patent Documents 2 through 4 requires the reflection surface provided to the light guide element to be a reflective material such a vapor deposited metal in order for reflection surface to reflect light from the light source. The drawback is that this therefore increases the material cost and the production cost of the light guide element.

To address the foregoing challenges, one or more embodiments of the present invention realizes a light guide element that can be produced at low cost and that enables reducing the size of an illumination device.

According to one or more embodiments of the present invention, a light guide element includes: an incidence surface wherefrom light enters from a light source; a first reflection surface configured to totally reflect at least a portion of the light entering from the incidence surface; a second reflection surface configured to totally reflect at least a portion of the light totally reflected by the first reflection surface as parallel light; and an emission surface configured to emit the parallel light totally reflected by the second reflection surface.

One or more embodiments of the present invention provides the effects of realizing a light guide element that can be produced at low cost and that enables reducing the size of an illumination device.

BRIEF DESCRIPTION OF THE DRAWINGS

FIG. 8A illustrates the path of light that forms no more than a predetermined angle with the optical axis of the light emitting unit; and FIG. 8B illustrates the path of light that forms an angle greater than the predetermined angle with the optical axis of the light emitting unit;

FIG. 9A is for describing the intensity of light emitted from the light emitting unit; FIG. 9B is a graph of the intensity of light emitted from the emission surface when the light guide element has no third reflection surface; and FIG. 9C is a graph of the intensity of light emitted from the emission surface when the light guide element includes a third reflection surface;

FIG. 10A is a graph illustrating the intensity of light emitted from the illumination device when the emission surface is rectangular; and FIG. 10B is a graph illustrating the intensity of light emitted from the illumination device when the emission surface is a parallelogram;

FIG. 13A is a cross-sectional view illustrating a structure of the light guide element; and FIG. 13B is an exploded view of around the incidence surface;

DETAILED DESCRIPTION

Embodiments of the invention are described below in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A stereoscopic display device 1 according to this embodiment is described with reference to FIG. 1 through FIG. 11B.
Configuration of Stereoscopic Display Device 1

Figure 1:
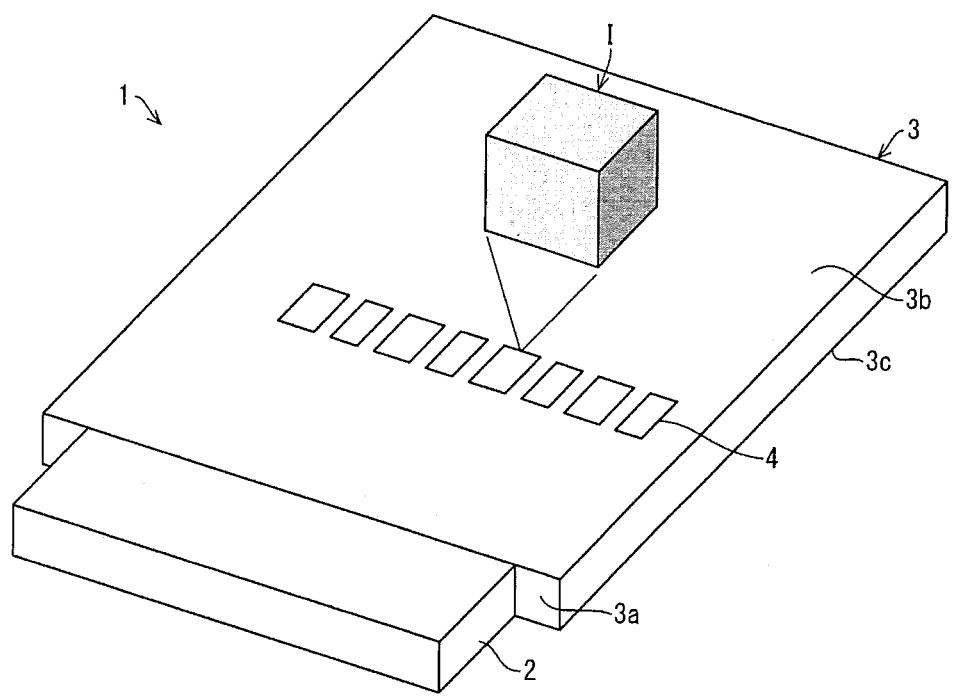
FIG. 1 is a perspective view illustrating a configuration of a stereoscopic display device according to a first embodiment of the present invention.

FIG. 1 is a perspective view illustrating a configuration of a stereoscopic display device 1 according to a first embodiment of the present invention.

The stereoscopic display device 1 is provided with an illumination device 2, a light guide plate 3, and an optical-path deflector 4 as illustrated in FIG. 1.

The illumination device 2 is configured for radiating a later-described incidence surface 3a of the light guide plate 3 orthogonally with light that is parallel (also referred to hereafter as parallel light). The illumination device 2 is described in detail below.

The light guide plate 3 is produced from a transparent resin material with a relatively high index of refraction. The light guide plate 3 includes: an incidence surface 3a where light enters from the illumination device 2; an emission surface 3b which is the front surface of the light guide plate 3 and which emits light; and a rear surface 3c whereon the optical-path deflectors 20 are formed.

Optical-path deflectors 4 are formed on the rear surface 3c of the light guide plate 3; an optical-path deflector 4 changes the optical path of light directed thereto and causes the light to exit from the emission surface 3b of the light guide plate 3. For instance, the optical-path deflectors 4 may be prisms.

In the stereoscopic display device 1, the parallel light emitted from the illumination device 2 enters the light guide plate 3 from the incidence surface 3a. Light entering the light guide plate 3 is guided through the light guide plate 3; the optical-path deflectors 4 change the optical path of the light and the emission surface 3b emits the light. The light emitted from the emission surface 3b forms a stereoscopic image I in a space. Given that the stereoscopic image I may be formed using existing techniques; therefore forming the stereoscopic image I is not described here.
Configuration of the Illumination Device A configuration of the illumination device 2 is described with reference to FIG. 2 through FIG. 5.

Figure 2:
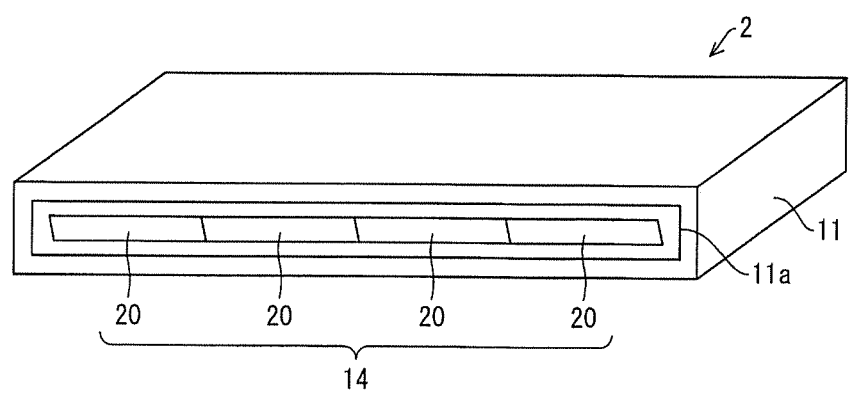
FIG. 2 is a perspective view illustrating a configuration of an illumination device provided to the above-mentioned stereoscopic display device.
Figure 3:
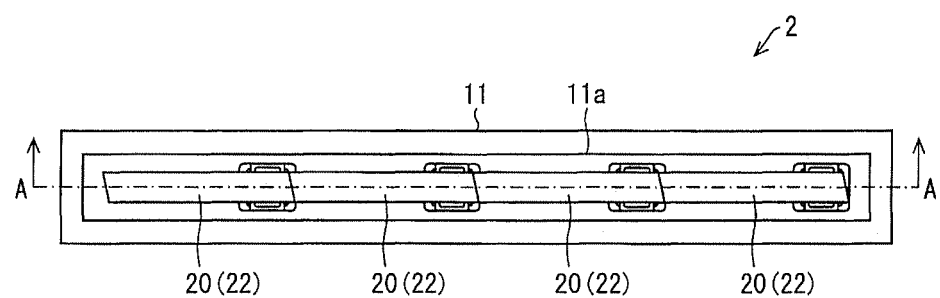
FIG. 3 is a front view of the above-mentioned illumination device.
Figure 4:
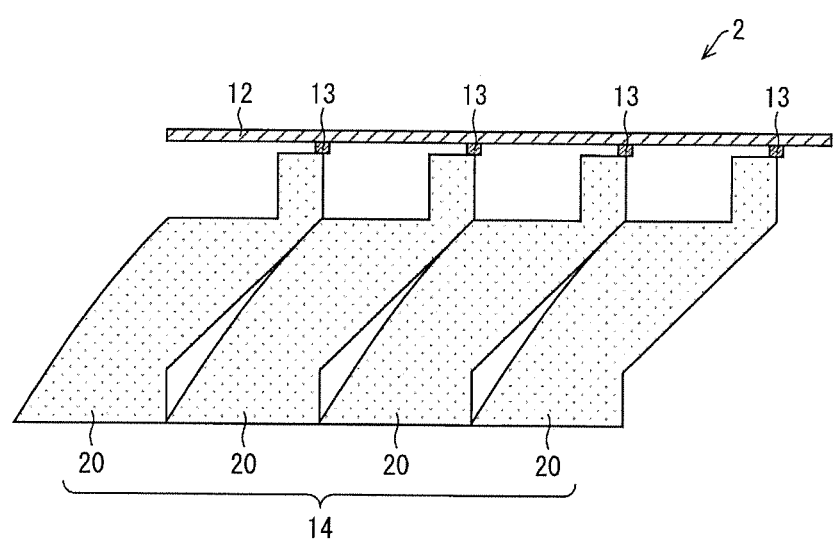
FIG. 4 is a cross-sectional view along the line A-A' in FIG. 3, and illustrates a configuration of the above-mentioned illumination device.
Figure 5:
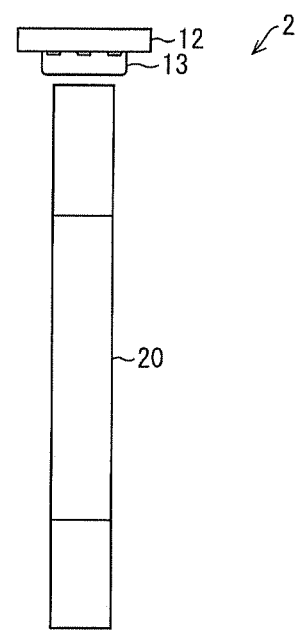
FIG. 5 is a side view of the above-mentioned illumination device.

FIG. 2 is a perspective view illustrating a configuration of the illumination device 2; FIG. 3 is a front view of the illumination device 2; FIG. 4 is a cross-sectional view along the line A-A' in FIG. 3, and illustrates a configuration of the illumination device 2; and FIG. 5 is a side view of the illumination device 2. Note that the enclosure 11 is omitted in FIGS. 4 and 5.

The illumination device 2 is provided with an enclosure 11, a substrate 12, four light emitting units (light sources 13), and a light guide unit 14 as illustrated in FIG. 2 through FIG. 5.

The enclosure 11 is a substantially rectangular body that houses the substrate 12 and the light guide element 20 inside. An opening 11a is formed in the enclosure 11 at a location corresponding to the incidence surface 3a of the light guide plate 3.

Figure 7:
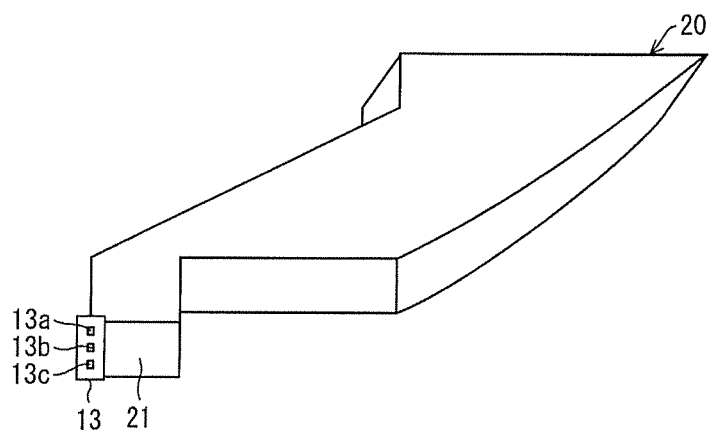
FIG. 7 is a perspective view illustrating an arrangement of the LEDs in a light emitting unit provided to the above-mentioned illumination device.

The four light emitting units 13 are mounted on the substrate 12 for radiating light toward the four light guide elements 20 provided in the light guide unit 14. The light emitting units 13 each include three light emitting diodes 13a, 13b, 13c (i.e., LEDs 13a, 13b, 13c) that emit red, green, and blue light, respectively (FIG. 7). The light emitting unit 13 adjusts the intensity of light emitted from the LED 13a, 13b, 13c to thereby emit the various colors of light. Thus, the color of the stereoscopic image I may be changed according to an effect.

The light guide unit 14 converts the light emitted from each of the light emitting units 13 into parallel light. The light guide unit 14 is configured from four light guide elements 20.

Within the light guide elements 20, the light emitted thereto from each of the light emitting units 13 is converted into parallel light. The light guide elements 20 are produced from a transparent resin material with a relatively high index of refraction. The structure of a light guide element 20 is described with reference to FIG. 6.

Figure 6:
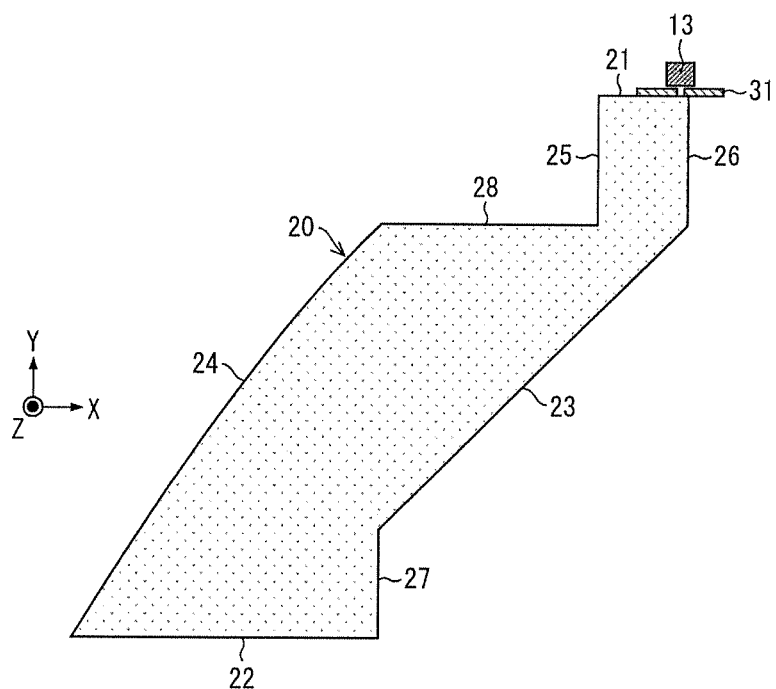
FIG. 6 is cross-sectional view illustrating a structure for a light guide element provided to the above-mentioned illumination device.

FIG. 6 is cross-sectional view illustrating a structure for a light guide element 20; and FIG. 6 also depicts the light emitting units 13. Note that for the sake of convenience, the description that follows refers to the positive X axis direction, the negative X axis direction, the positive Y axis direction, the negative Y axis direction, the positive Z axis direction, and the negative Z axis direction in FIG. 2, rightward, leftward, upward, downward, forward, and backward respectively.

The light guide element 20 is a predetermined thickness lengthwise; the light guide element 20 includes an incidence surface 21, an emission surface 22, a first reflection surface 23, a second reflection surface 24, a third reflection surface 25, a first connection surface 26, a second connection surface 27, and a third connection surface 28 as illustrated in FIG. 6.

The incidence surface 21 is a flat surface that allows light emitted from a light emitting unit 13 that travels leftward from the optical axis of the light emitting unit 13 to enter the light guide element 20. The optical axis of a light emitting unit 13 is along the normal of the light emitting surface of the light emitting unit 13 (i.e., perpendicular to the light emitting surface; Y axis direction, FIG. 6). The light guide element 20 is housed in the enclosure 11 with the incidence surface 21 parallel to the substrate 12.

FIG. 7 is a perspective view of the LEDs 13a, 13b, 13c in the light emitting unit 13. The light emitting unit 13 is positioned facing the incidence surface 21 of the light guide element 20 as illustrated in FIG. 7. The LEDs 13a, 13b, 13c in the light emitting unit 13 are aligned along the thickness of the light guide element 20 (Z axis direction, FIG. 6).

The emission surface 22 is a flat surface that emits the light directed in the light guide element 20. The emission surface 22 is provided parallel to the incidence surface 21 and is positioned facing the incidence surface 3a of the light guide plate 3. Light emitted by the emission surface 22 passes through the opening 11a in the enclosure 11 and irradiates the incidence surface 3a of the light guide plate 3. The emission surface 22 is a parallelogram (FIG. 2, and FIG. 3).

Light emitted from the light emitting unit 13 enters the light guide element 20 from the incidence surface 21; the first reflection surface 23 is a flat surface that causes the light which forms no more than a given angle (in this embodiment, 60°) with the optical axis of the light emitting unit 13 to totally reflect toward the second reflection surface 24; hereafter such light is referred to as low angle light.

The first reflection surface 23 is placed so that the first reflection surface 23 forms greater than a critical angle with the optical axis of the light emitting unit 13. Thus, light emitted from the light emitting unit 13 and striking the first reflection surface 23 directly (i.e., low angle light) is totally reflected by the first reflection surface 23.

The upper end of the first reflection surface 23 and the right end of the incidence surface 21 in the light guide element 20 are connected by a first connection surface 26 which is flat surface. The lower end of the first reflection surface 23 and the right end of the emission surface 22 are connected by a second connection surface 27, which is flat surface.

The first reflection surface 23 totally reflects light toward the second reflection surface 24; the second reflection surface 24 totally reflects this light toward the emission surface 22. The second reflection surface 24 is a parabolic surface with a focal line that extends through the location of a virtual image of the light emitting unit 13 (more accurately, the location of a virtual image of the LEDs 13a, 13b, 13c) formed by the first reflection surface 23. The aforementioned focal line extends orthogonally to the optical axis of the light emitting unit 13. In other words, the second reflection surface 24 is a parabola in a cross section in a plane that is perpendicular to the first reflection surface 23 and parallel to the traveling direction of the parallel light; the virtual image of the light emitting unit 13 on by the first section service 23 is the focal point position of the aforementioned parabolic line. Therefore, the light emitted from the light emitting units 13, reflected by the first reflection surface 23 and totally reflected by the second reflection surface 24 exits from the emission surface 22 perpendicularly. The second reflection surface 24 is provided so that light totally reflected by the first reflection surface enters the second reflection surface at an incidence angle that is greater than the critical angle.

The third reflection surface 25 reflects light emitted from the light emitting unit 13 and forming an angle greater than a given angle (in this embodiment, 60°) with the optical axis of the light emitting unit 13; hereafter, such light is referred to as high-angle light. That is, the third reflection surface 25 acts as an optical limiter, restricting the angle of incidence in relation to the first reflection surface 23; more specifically, the third reflection surface 25 limits the light from the light emitting unit 13 that directly reaches the first reflection surface 23 via the incidence surface 21. The third reflection surface 25 is provided perpendicular to the incidence surface 21 (i.e., along the Y axis direction) with the upper end thereof connected to the left and of the incidence surface 21. The lower end of the third reflection surface 25 and the upper end of the second reflection surface 24 are connected by a third connection surface 28 which is flat surface.

The light guide unit 14 of the embodiment is provided with four light guide elements 14 aligned along a direction perpendicular to the thickness of the light guide elements 20 (i.e., the X axis direction in FIG. 6) as illustrated in FIG. 4. More specifically, the light guide elements 20 provided to the light guide unit 14 are arranged so that the emission surfaces 22 thereof are mutually adjacent along the same plane. Light guide elements 20 in the light guide elements unit 14 of the embodiment are not limited to be aligned along a single direction (i.e. along a straight line). For example, a light guide unit according to an aspect of the present invention may be configured such that the light guide elements 20 are arranged two-dimensionally.

As illustrated in FIG. 6, a slit 31 is provided between the light emitting units 13 and the incidence surface 21. The slit 31 is for limiting the area irradiated by the light emitting unit 13. The light emitting units 13 have an emission area of fixed lateral width. Therefore, with no slit 31, the incidence angle of light emitted from the left end of the light emitting units 13 and light emitted from the right end of the light emitting units differ greatly when incident on the first reflection surface 23, which is at the same point of incidence. This reduces the degree to which light emitted from the emission surface 22 is parallel.

In contrast, a slit 31 is provided in the illumination device 2 between the light emitting unit 13 and the incidence surface 21; the configuration therefore limits the area irradiated laterally by the light emitting unit 13. Hereby, the light emitted from the light emitting units 13 and passing through the slit 31 do not have very different incidence angles on the first reflection surface 23, which is at the same point of incidence. This increases the degree of parallelism in the light emitted from the emission surface 22.

Path of Light Travels

The path of light emitted from the light emitting units 13 is described next with reference to FIG. 8.

Figure 8A:
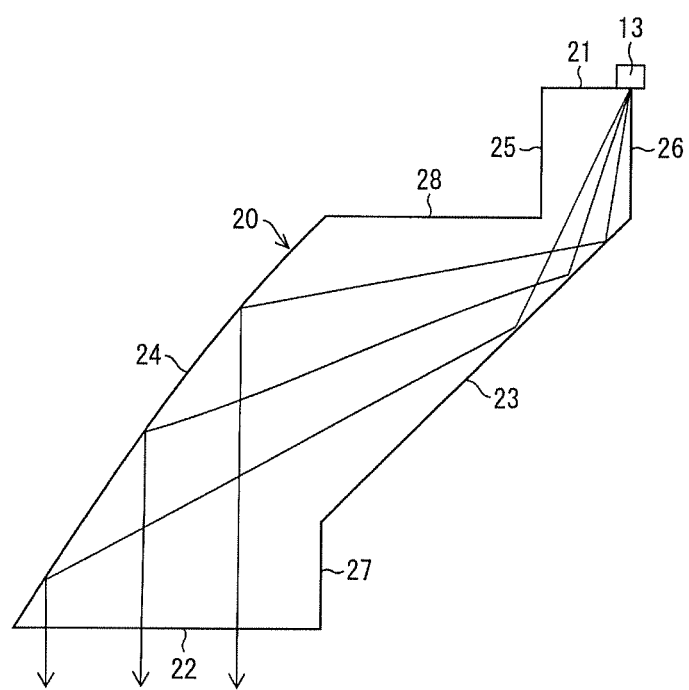
FIGS. 8A and 8B illustrate paths light travels in the above-mentioned illumination device when the light is emitted from the light emitting unit; more specifically.
Figure 8B:
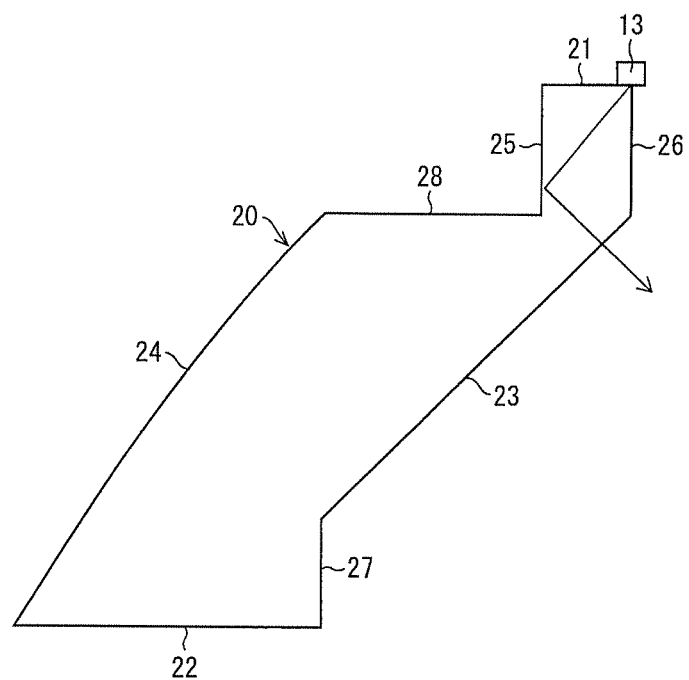

FIGS. 8A and 8B illustrate paths light travels in the above-mentioned illumination device when the light is emitted from the light emitting units 13; more specifically, FIG. 8A illustrates the path of light that forms no more than a predetermined angle with the optical axis of the light emitting unit; and FIG. 8B illustrates the path of light that forms an angle greater than the predetermined angle with the optical axis of the light emitting unit.

Low-angle light emitted from the light emitting units 13 is incident on light guide elements 20 from the incidence surface 21 and arrives directly at the first reflection surface 23 as illustrated in FIG. 8A. Light arriving at the first reflection surface 23 is incident on the first reflection surface 23 at greater than the critical angle as above described; therefore the light is totally reflected by the first reflection surface 23. The light totally reflected by the first reflection surface 23 then arrives at the second reflection surface 24. Light arriving at the second reflection surface 24 is incident on the second reflection surface 24 at greater than the critical angle; therefore, the light is totally reflected by the first reflection surface 23. As above described, the second reflection surface 24 is a parabolic surface with a focal line that extends through the location of a virtual image of the light emitting unit 13 formed by the first reflection surface 23 orthogonally to the optical axis of the light emitting unit 13. Therefore, like totally reflected by the second reflection surface is emitted from the emission surface perpendicularly. That is, the light emitted from the light emitting units 13 and arriving directly at the first reflection surface 23 (i.e., low angle light) is converted the parallel lights by the light guide elements 20.

High-angle light emitted from the light emitting units 13 is incident on light guide elements 20 from the incidence surface 21 and arrives directly at the third reflection surface 25 as illustrated in FIG. 8B. Light arriving at the third reflection surface 25 is totally reflected by the third reflection surface 25, passes through the first reflection surface 23 or the first connection surface 26, and is emitted to the outside.

The incidence surface 21 is only provided the left of the optical axis or the light emitting units 13 in the illumination device 2. Thus, the light emitted from the light emitting units 13 and emitted to the right side of the optical axis of the light emitting units 13 enters an adjacent light guide element 20, passes through said light guide element 20 and exits from the emission surface.

Intensity of Light Emitted from the Emission Surface

Next, the intensity of the light emitted from the emission surface 22 of the light guide elements 20 is described with reference to FIGS. 9A, 9B, and 9C.

Figure 9A:
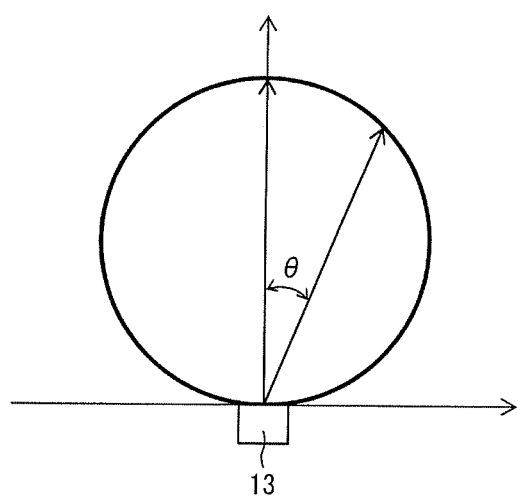
FIGS. 9A, 9B, and 9C are for describing the intensity of light emitted from the emission surface of the above-mentioned light guide element; more specifically.
Figure 9B:
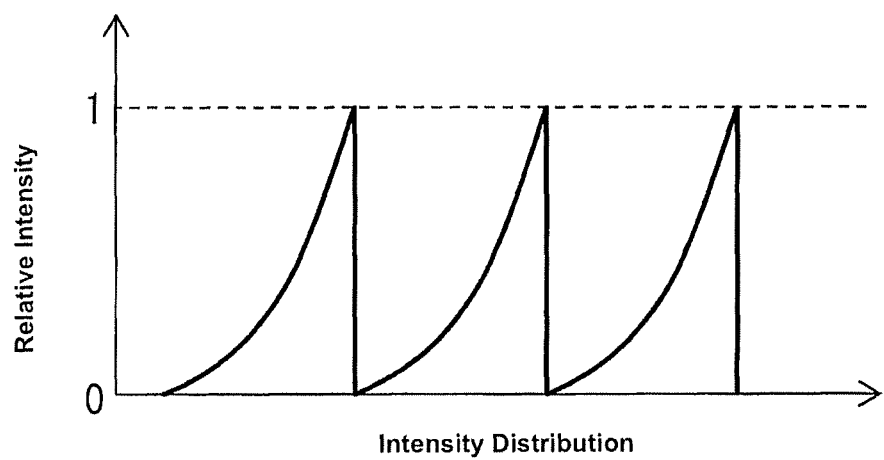
Figure 9C:
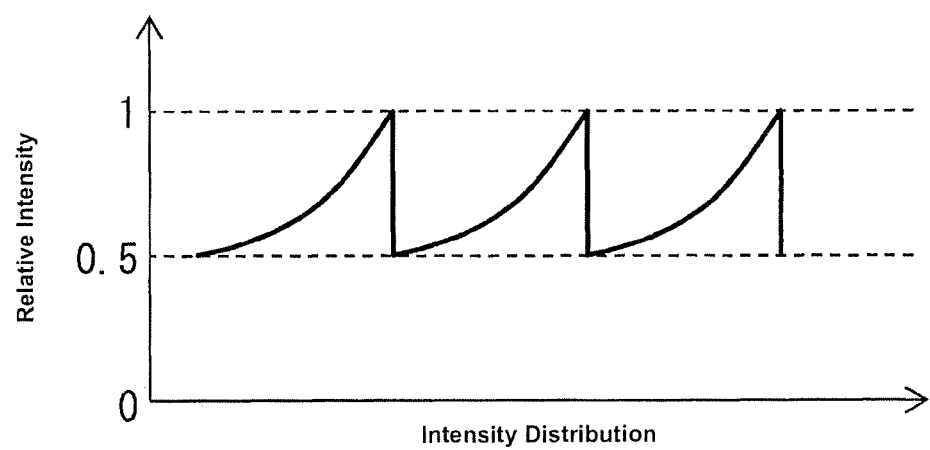

FIGS. 9A, 9B, and 9C are for describing the intensity of light emitted from the emission surface 22 of the light guide elements 20; more specifically, FIG. 9A is for describing the intensity of light emitted from the light emitting unit 13; FIG. 9B is a graph of the intensity of light emitted from the emission surface when the light guide element has no third reflection surface(s); and FIG. 9C is a graph of the intensity of light emitted from the emission surface when the light guide elements includes third reflection surface 25.

The light emitted from the light emitting elements 13 is diffused light; the light intensity is strongest when the light emission direction or coincides with the optical axis, and deteriorates in accordance with the angle of the emission direction relative to the optical axis. More specifically, taking the intensity of light emitted in the emission direction is taken as 1, the intensity of light forming an angle θ with the optical axis is cos(θ) as illustrated in FIG. 9A.

Consequently, high-angle light emitted from the light emitting unit has a low light intensity when no third reflection surface is present in the light guide elements, as illustrated in FIG. 9B; therefore, the light emitted from the emission surface large variations in intensity depending on the location.

In contrast, the light guide element 20 is provided with the third reflection surface 25 that reflects high-angle light emitted from the light emitting units 13 as above described; therefore, in no case does the high-angle light reach the first reflection surface 23 directly. This consequently prevents high-angle light from being emitted as parallel light, and as illustrated in FIGS. 9A, 9B, and 9C prevents a variation in the light intensity that is generated depending on the location.

The intensity of light emitted from the illumination device 2 is described next with reference to FIG. 10 through FIG. 11.

Figure 10A:
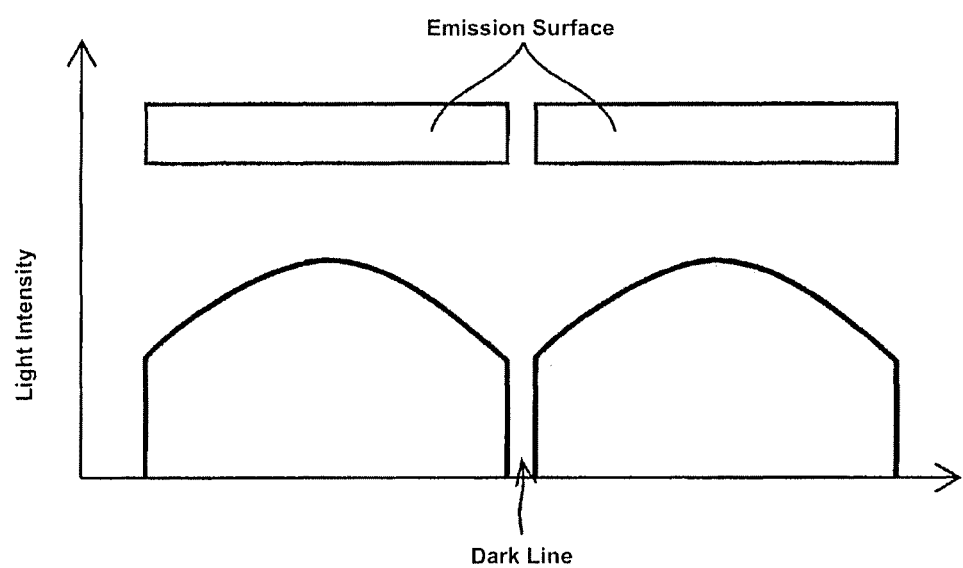
FIGS. 10A and 10B are for describing the intensity of light emitted from the above-mentioned illumination device; more specifically.
Figure 10B:
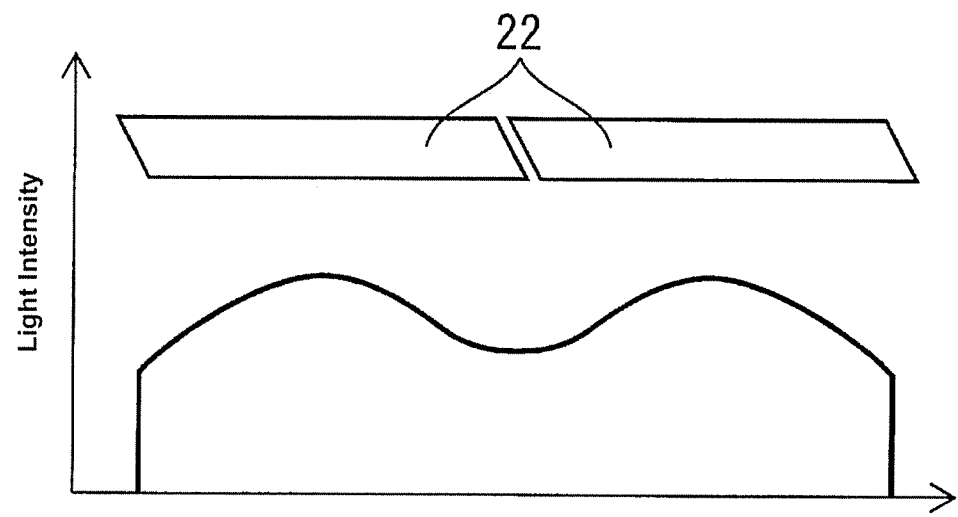
Figure 11A:
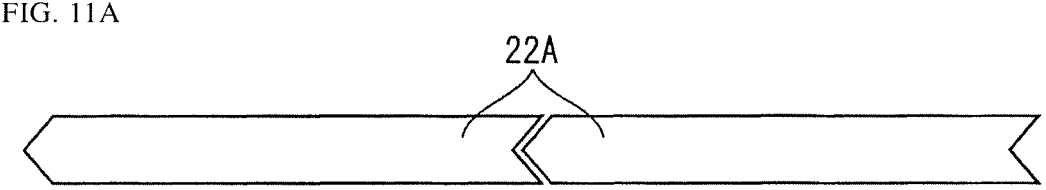
FIGS. 11A and 11B are for describing different shapes of the emission surface B as examples of modifying the above-mentioned emission surface.
Figure 11B:
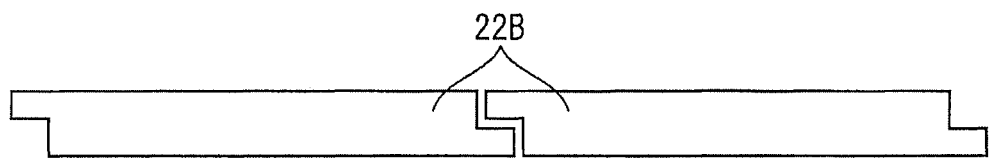

FIGS. 10A and 10B are for describing the intensity of light emitted from the above-mentioned illumination device; more specifically, FIG. 10A is a graph illustrating the intensity of light emitted from the illumination device when the emission surface is rectangular; and FIG. 10B is a graph illustrating the intensity of light emitted from the illumination device when the emission surface is a parallelogram. FIGS. 11A and 11B are for describing different shapes of the emission surface 22A, 22B as examples of modifying the above-mentioned emission surface.

No light is irradiated between mutually adjacent emission surfaces in the illumination device when the emission surface is rectangular as illustrated in FIG. 10A. Therefore, a dark line appears in the distribution of light emitted from the illumination device.

In contrast, the emission surfaces 22 in the illumination device 2 (i.e., the light guide unit 14) are parallelograms. Therefore, mutually adjacent emission surfaces 22 overlap each other in the direction the light guide elements 20 are aligned. As a result, this suppresses the generation of a dark line in the distribution of light emitted from the illumination device 2.

Although, the emission surfaces 22 in the illumination device 2 (i.e., the light guide unit 14) are parallelograms, the emission surfaces 22 are not limited thereto. For example, in one aspect, the illumination device may be provided with an emission surface 22A where one end protrudes in a V-shape, and the other end recedes in a V-shape as illustrated in FIG. 11A. In another aspect, the illumination device may be provided with an emission surface 22B which includes a step at the center portion relative to both ends (i.e., is tiered) as illustrated in FIG. 11B. The emission surface 22A and the emission surface 22B may be provided such shapes allow mutually adjacent emission surfaces overlap each other in the direction the light guide elements 20 is aligned. Consequently, this suppresses the generation of a dark line in the distribution of light emitted from the illumination device.

Features of the Light Guide Element 20, Light Guide Element Unit 14 and Illumination Device 2

As above described, a light guide element 20 according to the embodiment is provided with an incidence surface 21 wherefrom light enters from the light emitting unit 13; a first reflection surface 23; a second reflection surface 24; and an emission surface 22. The first reflection surface 23 totally reflects at least a portion of light incident thereon from the incidence surface 21; the second reflection surface 24 totally reflects at least a portion of light totally reflected thereto by the first reflection surface 23 as parallel light; and the emission surface 22 emits the parallel light totally reflected thereto by the second reflection surface 24.

In the above-mentioned configuration, light incident from the incidence surface 21 is totally reflected by the first reflection surface 23 and reflected by the second reflection surface 24, whereafter, the light is emitted from the emission surface 22 as parallel light. Therefore, there is no need to provide a reflective material such as a vapor deposited metal on the first reflection surface 23 and the second reflection surface 24. It is therefore possible to reduce the material and manufacturing cost of a light guide element that is for emitting parallel light.

As above described, there may be a need to convert light incident from an incident surface into parallel light with a single total reflection and to emit that light; such configurations require a longer distance from the incidence surface to the emission surface to secure a certain width along the path of the emission light. In contrast, in the above-mentioned configuration light incident from the incidence surface 21 is twice reflected via the first reflection surface 23 and the second reflection surface 24, whereafter the light is emitted from the emission surface 22 as parallel light. Accordingly, the configuration makes it possible to secure a certain width along the path of mission light while reducing the distance from the incidence surface 21 to the emission surface 22. Therefore, since it is possible to reduce the size of a light guide element 20 for emitting parallel light, it is also possible to realize an illumination device 2 that is a smaller size. The width of the path of emission light is the lateral length of the emission surface (FIG. 6).

The first reflection surface 23 in the light guide element 20 is a flat surface; additionally, the second reflection surface 24 is a parabola in a cross section that is in a plane perpendicular to the first reflection surface 23 and parallel to the traveling direction of the parallel light. The light emitting unit 13 may be arranged such that the location of the plane of symmetry between the light emitting unit 13 and the first reflection surface 23 is the location of the focal line of the parabolic shape of the second reflection surface 24. Hereby, light reflected by the second reflection surface 24 is converted to parallel light.

A collimator for emitting parallel light may have lens-shaped emission surface. Light entering the emission surface of collimator from the same location when viewed from a direction perpendicular to the thickness of the collimator will spread within plane along the thickness of the collimator; therefore, the light has different incidence angles on the emission surface. This generates an aberration in the light emitted from the emission surface of the collimator as a result. In contrast, there are no aberrations in the light emitted from a light guide element 20 of the present invention, given that light is converted to parallel light within the light guide element 20.

That is, the light guide element 20 is equipped with a third reflection surface 25 that restricts the incidence angles on the first reflection surface 23; more specifically, the third reflection surface 25 limits the light from the light emitting unit 13 that directly reaches the first reflection surface 23 via the incidence surface 21. Light from the emitting unit 13 is typically diffused, where the amount of light decreases with distance from the optical axis. In contrast, since the above-mentioned configuration limits the range of incidence angles on the first reflection surface 23, it is possible reduce the non-uniformity in the light intensity along the optical path of the light incident on the first reflection surface 23. Therefore, this reduces the variations in the light intensity generated depending on the location for the parallel light finally emitted from the emission surface.

Given a tangent at the end of the second reflection surface 24 opposite to the emission surface 22 (the upper end) of the light guide element 20, the slope of the tangent relative to the emission surface 22 is greater than or equal to the slope the first reflection surface 23 relative to the emission surface 22 in a plane perpendicular to the first reflection surface 23 and parallel to the traveling direction of the parallel light (i.e., the XY plane in FIG. 6). Hereby, the plurality of light guide elements 20 may be aligned perpendicular to the thickness of the light guide elements 20 with the emission surfaces 22 mutually adjacent in the same plane.

More specifically, the light guide unit 14 of this embodiment is provided with four light guide elements 20, where the emission surface 22 of each light guide element 20 is mutually adjacent along the same plane. The above-mentioned configuration provides each light guide element 20 in the light guide unit 14 with a light emitting unit 13; hereby, it is possible to radiate light using four light emitting units 13. Light with strong light intensity may be radiated as a result. The light guide elements 20 in the light guide unit 14 are arranged so that the emission surfaces 22 are aligned along the same plane. Therefore, the parallel light radiating from the light guide unit 14 has a large surface area.

Note that the light guide elements in the light guide unit may be aligned along the thickness of the light guide elements. In this case, the light guide unit is capable of radiating light of a stronger intensity.

In contrast, the emission surface 22 in the light guide unit 14 are parallelograms. Therefore, mutually adjacent emission surfaces 22 overlap each other in the direction that the light guide elements 20 are aligned. Consequently, this suppresses the generation of a dark line in a graph of the distribution of light emitted from the illumination device 2 (light guide unit 14).

The illumination device 2 in this embodiment is provided with a light guide unit 14 and four light emitting units 13. The above-mentioned configuration allows for a smaller illumination device 2 that can be produced at low cost since the light guide unit 14 is configured from the light guide elements 20.

The plurality of light emitting unit 13 are mounted on the same substrate 12 in the illumination device 2. Therefore, this allows for a simpler illumination device 2, and increases the ease of assembly, since the plurality of light emitting unit 13 can be mounted on the same substrate 12.

The LEDs 13a, 13b, 13c in the light emitting unit 13 are aligned along the thickness of the light guide element 20 (Z axis direction, FIG. 6) in the illumination device 2. The above-mentioned configuration prevents the light emitted from the LEDs 13a, 13b, 13c from separating into different colors and increases the degree of parallelism in the light emitted from the emission surface 22.

While the illumination device 2 (i.e., the light guide unit 14) is configured with four light guide elements 20 in this embodiment, the number of light guide elements 20 is not limited thereto. In other words, the number of light guide elements 20 in the illumination device (i.e., the light guide unit may be adapted in accordance with the size of the light guide plate (i.e., the size of the stereoscopic display device) as appropriate.

The first reflection surface 23 in the light guide element 20 is a flat surface; the second reflection surface 24 in the light guide element 20 is a parabolic surface with a focal line that extends through the location of a virtual image of the light emitting unit 13 formed by the first reflection surface 23 orthogonally to the optical axis of the light emitting unit 13. For instance, while the second reflection surface is a parabolic surface with a focal line extending through the light emitting unit 13 orthogonal to the optical axis thereof, the second reflection surface may be a flat surface. With a flat second reflection surface the light emitted from the light emitting unit 13 is totally reflected by the first reflection surface and converts to parallel light, and the second reflection surface totally reflects said parallel light, causing parallel light to exit from the emission surface.

Note that some areas of the emission surfaces in the light guide elements do not emit light in the illumination devices described in JP 2005-228502 A; JP 2011-243521 A; JP 2005-190669 A; and JP 2013-137979 A. Therefore, when the emission surfaces of the light guide elements are aligned in the same plane, a dark area appears in the distribution of light emitted from the emission surfaces. In contrast, the light guide elements 20 are aligned in the illumination device 2 so that the emission surfaces 22 of mutually adjacent light guide elements 20 are adjacent. Therefore, no dark areas appear in the distribution of light emitted from the emission surfaces 22.

Second Embodiment

Another embodiment of the present invention is described below with reference to FIG. 12 through FIG. 16. For the sake of convenience, components previously described in an embodiment that have an identical function are given the same reference numerals, and explanations therefor are omitted.

The light emitted from the light emitting unit 13 toward the right of the optical axis of the light emitting unit 13 passes through the adjacent light emitting unit 20 and is emitted from the emission surface 22 in the illumination device 2 of the first embodiment. This kind of light is not necessary (i.e., stray light) and may cause the stereoscopic image I formed by the stereoscopic display device 1 to be blurry.

Therefore, the illumination device 2A according to this embodiment is different from the illumination device 2 in that the illumination device 2A prevents the above-mentioned stray light from being generated.

Configuration of the Illumination Device 2A

A configuration of the illumination device 2A is described with reference to FIG. 12 through FIGS. 15A and 15B.

Figure 12:
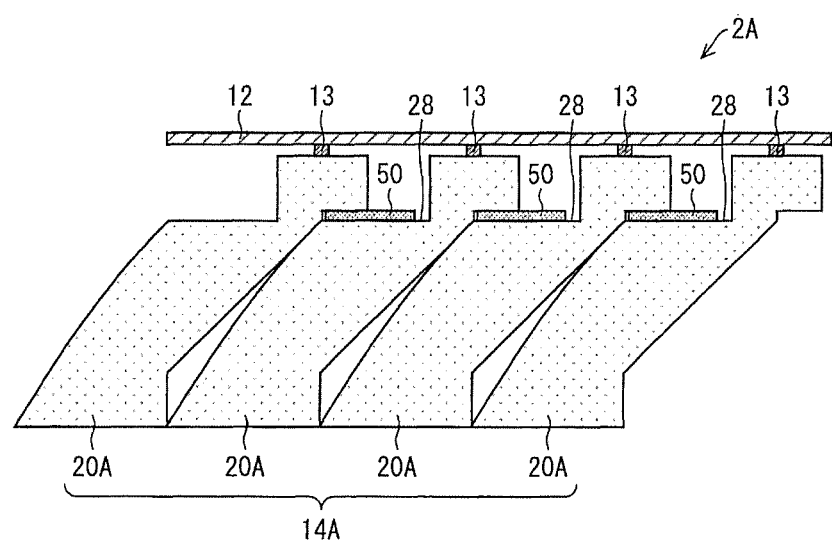
FIG. 12 is a perspective view illustrating a configuration of an illumination device according to a second embodiment of the present invention.

FIG. 12 is a perspective view illustrating a configuration of the illumination device 2A; note that the enclosure 11 is omitted in FIG. 12.

Instead of the light guide unit 14 of the first embodiment, the illumination device 2A includes a light guide unit 14A as illustrated in FIG. 12. The light guide unit 14A is provided with a light guide element 20A instead of the light guide element 20 in the light guide unit 14.

The structure of the light guide element 20A is described with reference to FIG. 13.

Figure 13A:
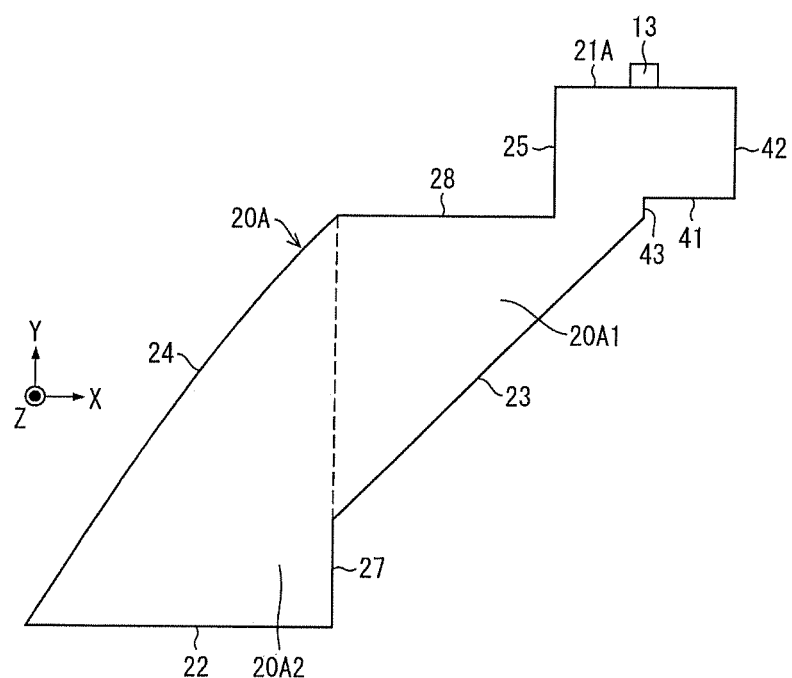
FIGS. 13A and 13B are for describing a configuration of the light guide element in the above-mentioned illumination device; more specifically.
Figure 13B:
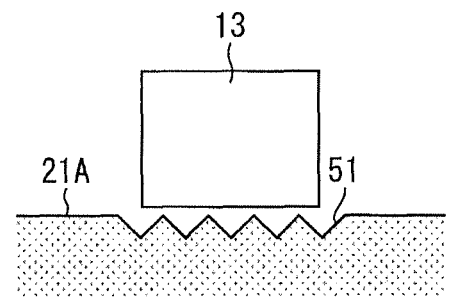

FIGS. 13A and 13B are for describing a configuration of the light guide element 20A; more specifically, FIG. 13A is a cross-sectional view illustrating a structure of the light guide element 20A; and FIG. 13B is an exploded view of around the incidence surface 21A; FIG. 13A also depicts the light emitting units 13.

The light guide element 20A is provided with an incidence surface 21A as illustrated in FIG. 13A instead of the incidence surface 21 of the first embodiment. The light guide element 20A is also provided with a second emission surface 41, a fourth connection surface 42, a fifth connection surface 43, and a light shield part 50 (i.e., a stray light suppressor).

The incidence surface 21A differs from the incidence surface 21 of the first embodiment in that the incidence surface 21A extends to the right of the optical axis of the light emitting unit 13. The incidence surface 21A also includes prisms 51 (i.e., optical shapes) in a region facing the light emitting unit 13 as illustrated in FIG. 13B. In this embodiment, there are five prisms 51 aligned at a pitch of 0.1 mm; the apex angle of the prism 51 is 90°. When light emitted from the light emitting unit 13 enters the light guide element 20A from the incidence surface 21A, the prisms 51 change the refraction direction of light in accordance with the location.

The second emission surface 41 is flat and perpendicular to the optical axis of the light emitting unit 13. The incidence surface 21A and the right end of the second emission surface 41 are connected via a flat fourth connection surface 42 in the light guide element 20A. The left end of the incidence surface 21A and the upper end of the first reflection surface 23 are connected via a flat fifth connection surface 43.

The light shield 50 is provided at the upper part of the third connection surface 28 in the light guide element 20A as illustrated in FIG. 12. The light shield 50 blocks light emitted from the second emission surface 41 of an adjacent light guide element 20A.

Path of Light Travels

The path of light emitted from the light emitting units 13 in this embodiment is described next with reference to FIG. 14 and FIG. 15.

Figure 14:
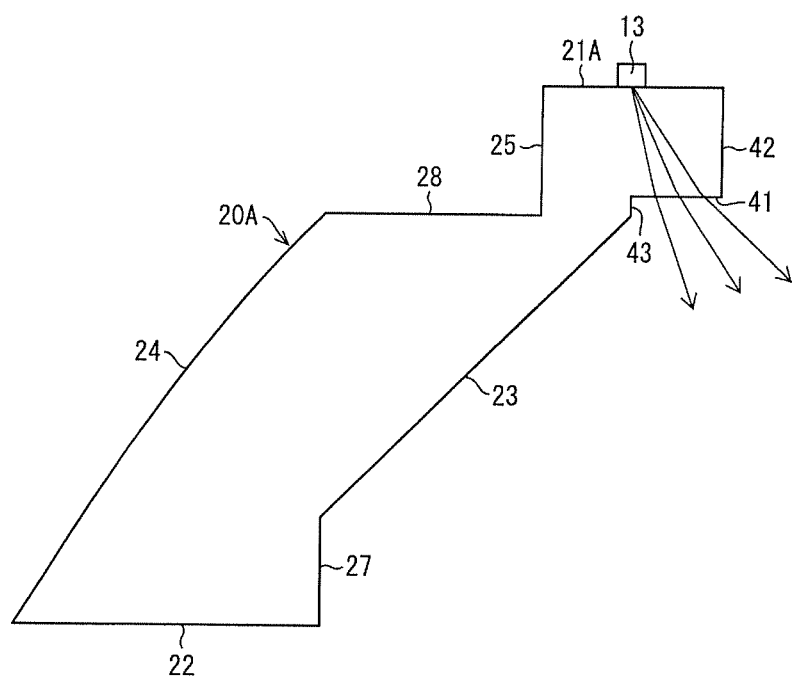
FIG. 14 illustrates a path light travels in the above-mentioned illumination device when the light is emitted from the light emitting unit.

FIG. 14 illustrates a path light travels when the light is emitted from the light emitting unit 13.

As illustrated in FIG. 14, light emitted from the light emitting unit 13 and emitted toward the right relative to the optical axis of the light emitting unit 13 enters the light guide element 20A at the incidence surface 21A, whereafter the light travels through the light guide element 20A and exits from the second emission surface 41.

As above described, a light shield 50 is provided next to the lower end of the second emission surface 41 (i.e., at the upper part of the third connection surface 28 in the adjacent light guide element 20A); therefore, the light shield 50 blocks light emitted from the second emission surface 41. It is thus possible to prevent light emitted from the light emitting unit 13 and traveling from the optical axis of the light emitting unit 13 toward the right from becoming stray light.

Light Intensity Distribution

The intensity of light emitted from the illumination device 2A is described next with reference to FIG. 15.

Figure 15A:
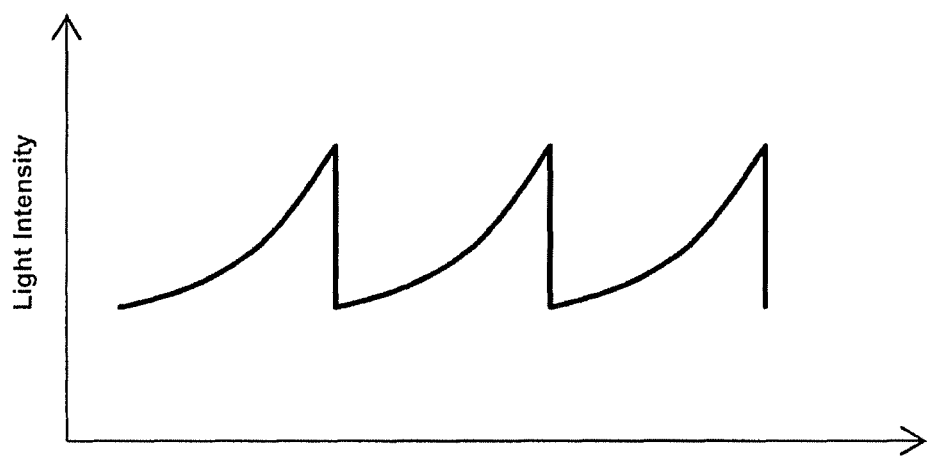
FIG. 15A is a graph illustrating an intensity distribution for light emitted from an illumination device according to the first embodiment.
Figure 15B:
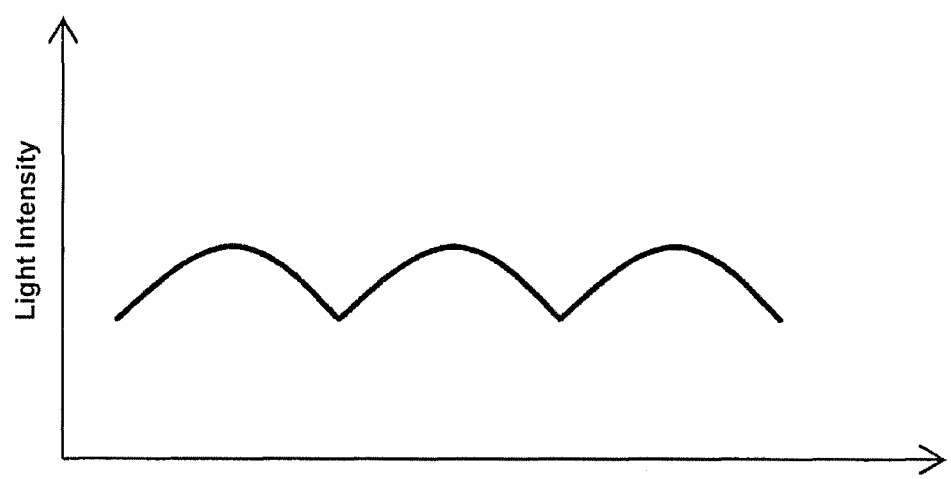
FIG. 15B is a graph illustrating an intensity distribution for light emitted from an illumination device according to the second embodiment.

FIG. 15A is a graph illustrating an intensity distribution for light emitted from an illumination device 2 according to the first embodiment; and FIG. 15B is a graph illustrating an intensity distribution for light emitted from an illumination device 2A according to the second embodiment.

As above described, the light emitted from the light emitting elements 13 is diffused light; the light intensity is strongest when the light emission direction or coincides with the optical axis, and deteriorates in accordance with the angle of the emission direction relative to the optical axis.

Accordingly, there is a large variance between the intensity of light emitted from around the end of the emission surface 22 in one direction and the end in the other direction on a light guide element 20 in the illumination device 2 of the first embodiment. Consequently, the intensity distribution of light emitted from the illumination device 2 is non-uniform as illustrated in FIG. 15A.

In contrast, the incidence surface 21A in the illumination device 2A of this embodiment includes prisms 51. Thus, when light emitted from the light emitting unit 13 enters the light guide element 20A from the incidence surface 21A, the prisms 51 change refraction direction of light in accordance with the location. The illumination device 2A can thus make use of the light with strong light intensity near the optical axis of the light emitting unit 13 when emitting light. Therefore, the illumination device 2A reduces the variations in light intensity that is generated depending on the location as illustrated in FIG. 15B.

Example of Producing the Light Guide Element 20A

As illustrated in FIGS. 13A and 13B, the light guide element 20A may be partitioned into two components. More specifically, the light guide element 20A may be partitioned by a plane passing from the left end of the third connection surface 28 and the left end of the first reflection surface 23, thus creating a first component 20A1 that includes the first reflection surface 23 and a second component 20A2 that includes the second reflection surface 24.

The structure of the light guide element 20A is described with reference to FIG. 16.

Figure 16A:
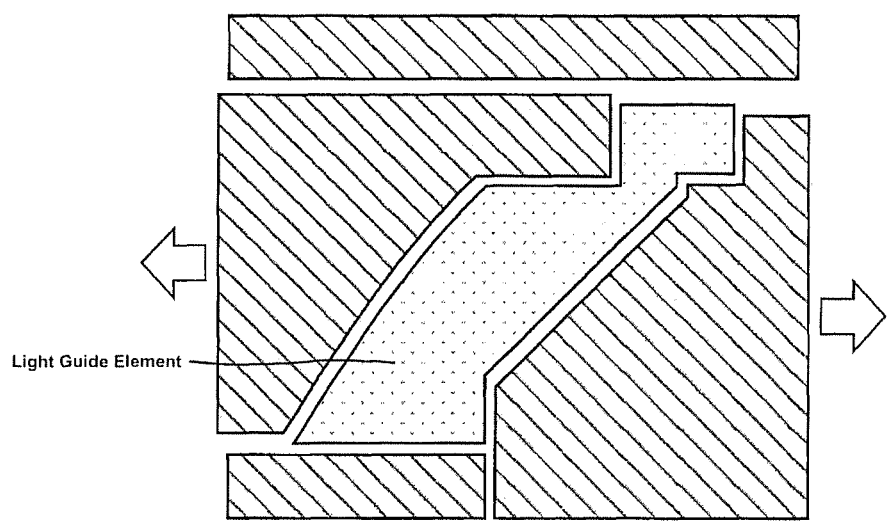
FIG. 16A illustrates a method of manufacturing the light guide element when the light guide element cannot be partitioned.
Figure 16B:
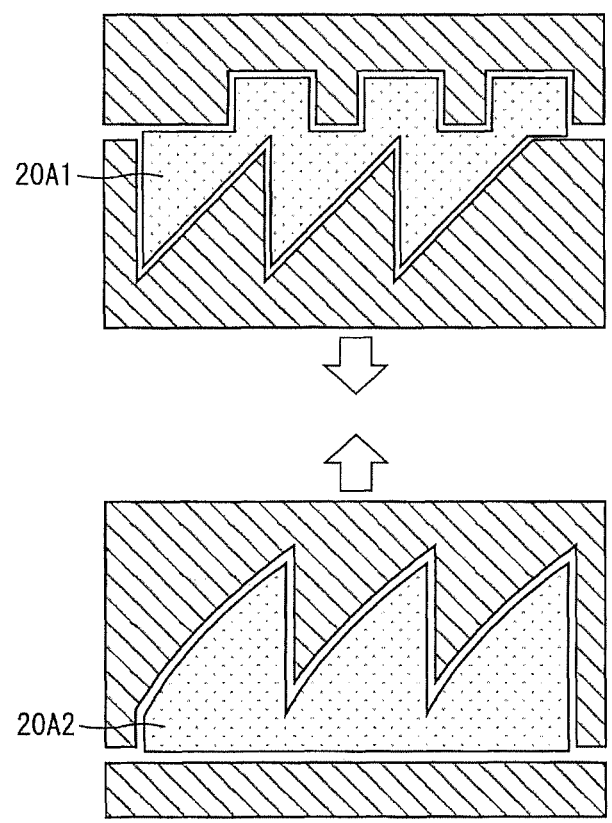
FIG. 16B illustrates a method of manufacturing the light guide element when the light guide element may be partitioned.

FIG. 16A illustrates a method of manufacturing the light guide element when the light guide element cannot be partitioned; and FIG. 16B illustrates a method of manufacturing the light guide element 20A when the light guide element is partitioned. The light guide element described here is die-cast.

First, it is assumed that the first reflection surface and the second reflection surface in the light guide element of the present invention require high-precision manufacturing in order to produce parallel light. Therefore, a light guide element that cannot be partitioned for casting requires sliding at least two die blocks laterally as illustrated in FIG. 16A. This increases the cost of casting the light guide element because it tends to be difficult to increase the number of castings that can be made with a single die.

In contrast, in this embodiment, the light guide element 20A may be partitioned into a first component 20A1 and a second component 20A2. The first component 20A1 and the second component 20A2 may be produced separately as a result. Hereby, only one die block needs to slide to create the first component 20A1 and the second component 20A2 respectively as illustrated in FIG. 16B. After being produced, the first component 20A1 and second component 20A2 may be combined vertically to create the light guide element 20A. As above described, the first component 20A1 or the second component 20A2 may be produced when manufacturing the light guide element 20A by sliding a single die block; therefore, this increases the number of castings that can be taken from a single die. Consequently, the light guide element may be produced at less cost.

As illustrated in FIG. 16B, a plurality of first component 20A1 and a plurality of second component 20A2 may each be integrally molded and subsequently combined. Hereby, adjacent components for a plurality of light guide elements 20A may be produced integrally.

As above described, the light guide element 20A is provided with a light shield 50; the light shield 50 prevents light from the light emitting unit 13 not traveling via the first reflection surface 23 from irradiating at least any one of the second reflection surface 24 and the emission surface 22. The light shield thus prevents emission of stray light from the emission surface 22, which is not the parallel light appropriately reflected by the first reflection surface 23 and the second reflection surface 24.

The light guide 20A is also provided with prisms 51 on the incidence surface 21A; the prisms 51 change the refraction direction of light in accordance with the location when light from the light emitting unit 13 is incident via the incidence surface 21A. Light from the light emitting unit 13 is typically diffused, where the amount of light decreases with distance from the optical axis. In contrast, with the above configuration the prisms 51 prevent a reduction in the light intensity; therefore, it is possible to reduce the variations in light intensity generated depending on the location for the parallel light finally emitted from the emission surface 22.

The light guide element 20A may be partitioned into a first component 20A1 including the first reflection surface 23 and a second component 20A2 including the second reflection surface 24. The first component 20A1 and the second component 20A2 may be produced separately as a result. Thus, the first component 20A1 or the second component 20A2 may be produced when manufacturing the light guide element 20A by sliding a single die block. Because more castings may be taken with a single die, the light guide element may be produced at less cost.

Modification Example 1

Next, a light guide element 20B is described with reference to FIG. 17 as an example of modifying the light guide element 20A.

Figure 17:
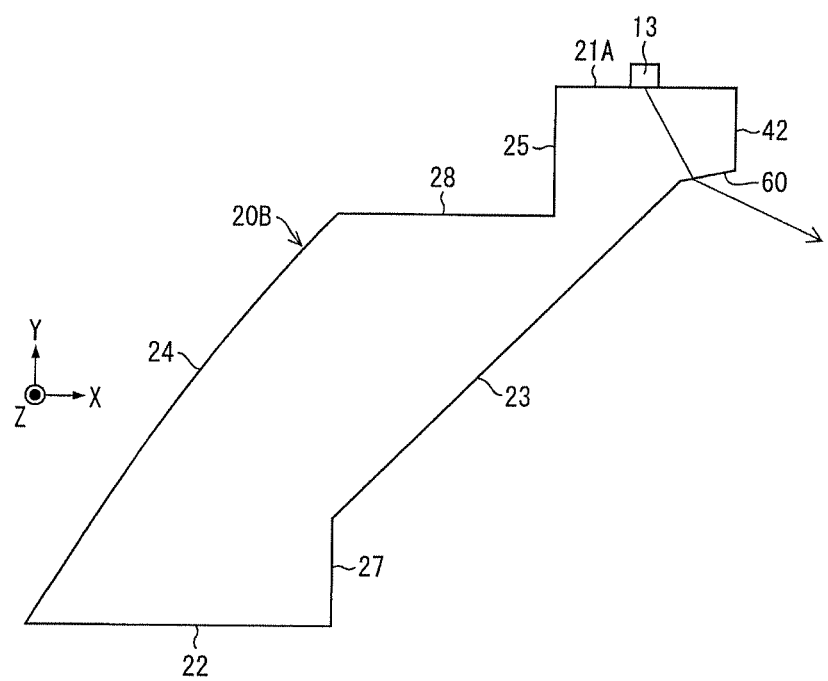
FIG. 17 is a cross-sectional view of a structure for the light guide element as an example of modifying the above-mentioned light guide element.

FIG. 17 is a cross-sectional view of a structure for the light guide element 20B.

The light guide element 20B is provided a second emission surface 60 (i.e., a stray light suppressor) as illustrated in FIG. 17 instead of the second emission surface 41 of the light guide element 20A. The second emission surface 60 is a slanted surface that inclines toward the incidence surface 21A with distance from the optical axis of the light emitting unit 13. The light emitted from the light emitting unit 13 and exiting from the second emission surface 60 is thus refracted by the second emission surface 60 and is emitted outside the light guide element 20B; this light enters the adjacent light guide element 20B at the third connection surface 28. The second emission surface 60 refracts light entering the third connection surface 28, increasing the incidence angle thereof relative to the third connection surface 28; therefore, the light is totally reflected at the third connection surface 28. It is thus possible to prevent the light emitted from the light emitting unit 13 and emitted toward the right of the optical axis of the light emitting unit 13 to be emitted from the emission surface of the light guide element 20B; that is, it is possible to prevent generating stray light.

It is also possible change the incidence surface of the light guide element to prevent the light emitted from the light emitting unit 13 and toward the right of the optical axis of the light emitting unit 13 from exiting via the emission surface of the light guide element. This configuration is described with reference to FIGS. 18A and 18B.

Figure 18A:
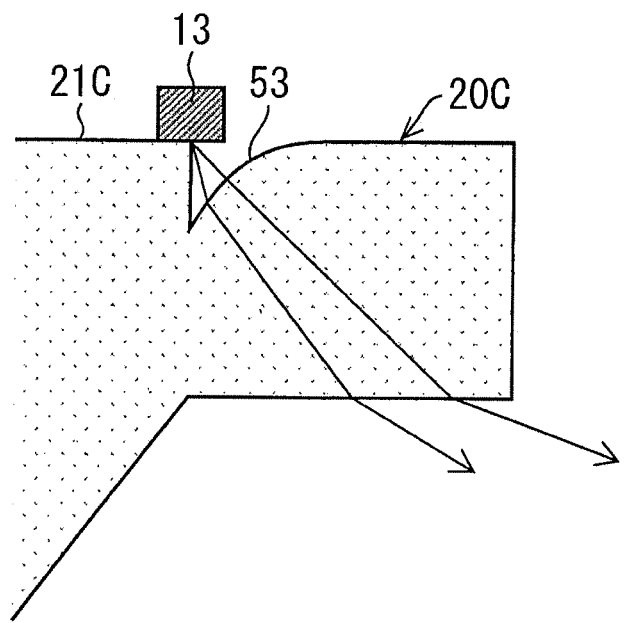
FIG. 18A is an exploded view of around the incidence surface of the light guide element as an example of modifying a light guide element of the second embodiment.
Figure 18B:
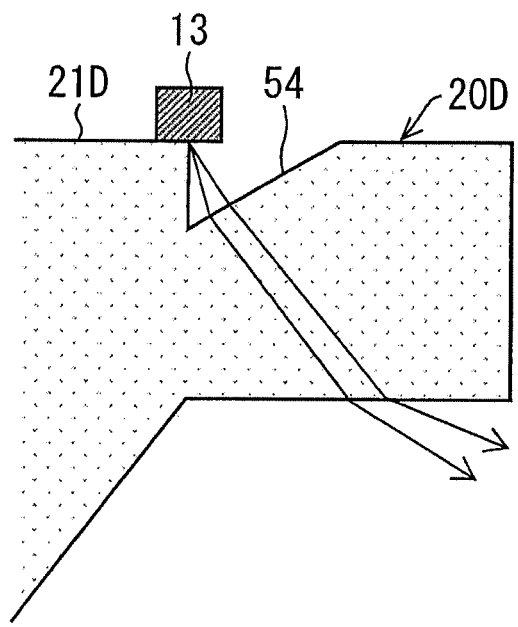
FIG. 18B is an exploded view of around the incidence surface of the light guide element as another example of modifying a light guide element of the second embodiment.

FIG. 18A is an exploded view of around the incidence surface 21C of the light guide element 20C as an example of the light guide element 20A; and FIG. 18B is an exploded view of around the incidence surface 21D of the light guide element 20D as another example of modifying the light guide element 20A.

The light guide element 20C includes the incidence surface 21C as illustrated in FIG. 18A. The incidence surface 21C is provided with a cutout 53 (i.e., a stray light suppressor) at the right of the optical axis of the light emitting unit 13; the cutout 53 is lens shaped. The cutout 53 in the light guide element 20C refracts the light emitted from the light emitting unit 13 toward the right of the optical axis of the light emitting unit 13; this increases the incidence angle thereof toward the third connection surface 28 of an adjacent light guide element 20C. The light is thusly totally reflected at the third connection surface 28; therefore, the configuration prevents the light emitted from the light emitting unit 13 toward the right of the optical axis of the light emitting unit 13 from exiting via the emission surface of the light guide element 20C.

The light guide element 20D includes the incidence surface 21D as illustrated in FIG. 18B. The incidence surface 21D includes a slanted surface 54 (i.e., a stray light suppressor) that inclines upward and to the right with distance toward the right of the optical axis of the light emitting unit 13. The slanted surface 54 in the light guide element 20D refracts the light emitted from the light emitting unit 13 toward the right of the optical axis of the light emitting unit 13; this increases the incidence angle thereof toward the third connection surface 28 of an adjacent light guide element 20D. The light is thusly totally reflected at the third connection surface 28; therefore, the configuration prevents the light emitted from the light emitting unit 13 toward the right of the optical axis of the light emitting unit 13 from exiting via the emission surface of the light guide element 20D.

Modification Example 2

Next, a light guide element 20E is described with reference to FIG. 19 as an example of modifying the light guide element 20A.

Figure 19:
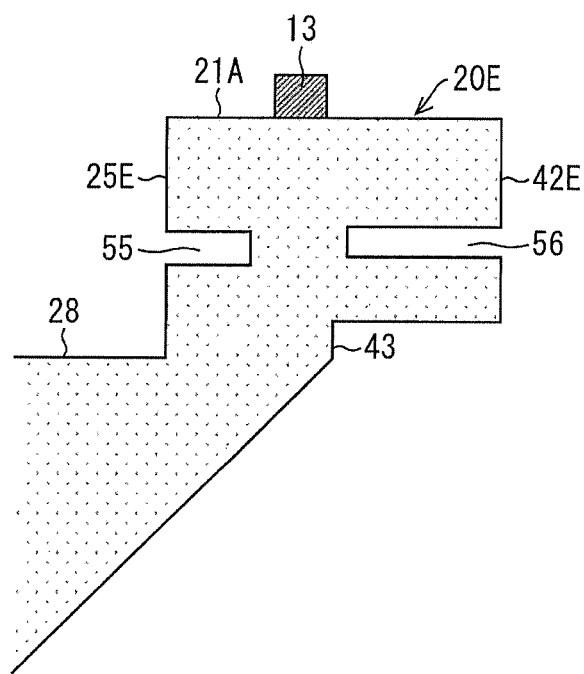
FIG. 19 is an exploded view of around the incidence surface of the light guide element as another example of modifying a light guide element of the second embodiment.

FIG. 19 is an exploded view of around the incidence surface 21A of the light guide element 20E.

The light guide element 20E is provided with a third reflection surface 25E and a fourth connection surface 42E as illustrated in FIG. 19, instead of the third reflection surface 25 and the fourth connection surface 42 of the light guide element 20A.

The third reflection surface 25E and the fourth connection surface 42E are as a cutout 55 and a cutout 56, respectively; the cutouts 55, 56 each face the optical axis of the light emitting unit 13. The cutout 55 and the cutout 56 limits the range of incidence angles of light emitted from the light emitting unit 13 on the first reflection surface 23. The light guide element 20E is provided with a cutout 55 and a cutout 56; hereby, the light guide element 20E exhibits the effect of providing the slit 31 from the first embodiment. At the same time, the cutouts 55, 56 ensure that there are no large changes in the incidence angles for the light emitted from the light emitting unit 13 and passing through the slit 31 at the same incidence point on the first reflection surface 23. This increases the degree to which light emitted from the emission surface 22 is parallel.

Third Embodiment

Another embodiment of the present invention is described below with reference to FIG. 20 through FIG. 22. For the sake of convenience, components previously described in an embodiment that have an identical function are given the same reference numerals, and explanations therefor are omitted.

The illumination device 2A according to the second embodiment is provided with prisms 51 on the incidence surface 21A; this configuration allows the illumination device 2A to reduce the non-uniform light intensity of light emitted therefrom. Whereas, an illumination device 2F according to this embodiment reduces the non-uniform light intensity in the light emitted therefrom via a different technical concept.

A configuration of the illumination device 2F is described with reference to FIG. 20; note that the enclosure 11 is omitted in FIG. 20.

Figure 20:
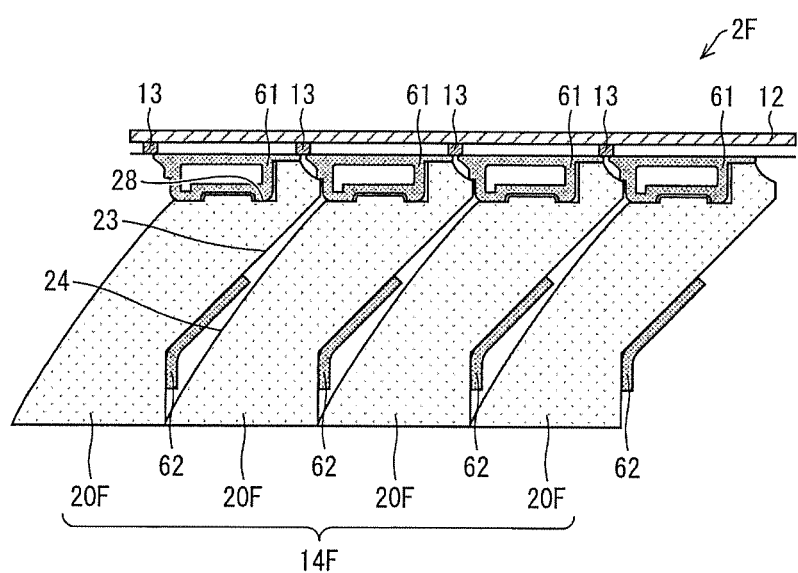
FIG. 20 is a cross-sectional view illustrating an illumination device according to a third embodiment of the present invention.

FIG. 20 is a cross-sectional view of the illumination device 2F. Instead of the light guide unit 14 of the first embodiment, the illumination device 2F includes a light guide unit 14F as illustrated in FIG. 20. The light guide unit 14F is provided with a light guide element 20F instead of the light guide element 20 in the light guide unit 14. In addition to the features of the illumination device 2 of the first embodiment, the illumination device 2F includes a light shield 61 (i.e., a stray light suppressor) and a light shield 62 (i.e., a stray light suppressor).

The structure of the light guide element 20F is described with reference to FIG. 21 and FIG. 22.

Figure 21:
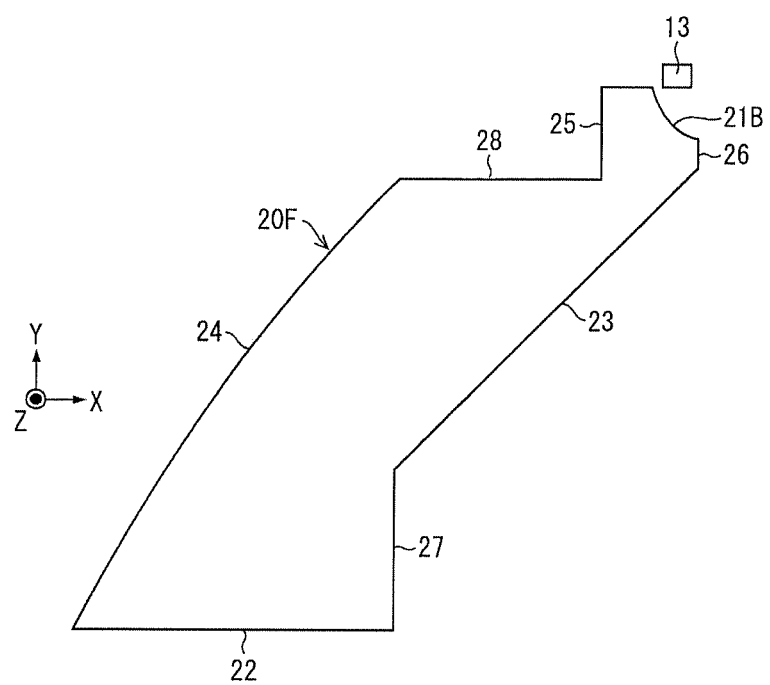
FIG. 21 is cross-sectional view illustrating a structure for a light guide element provided to an illumination device according to a third embodiment of the present invention.
Figure 22:
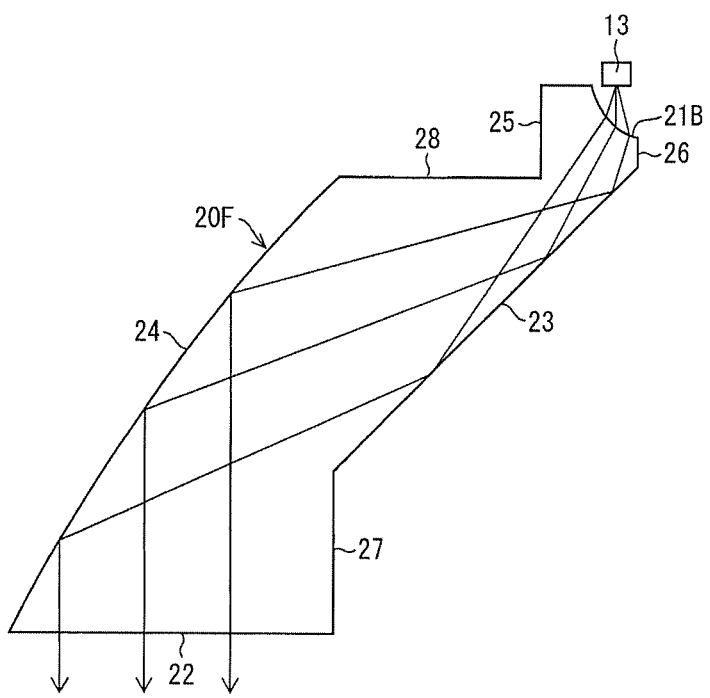
FIG. 22 illustrates a path light travels in an illumination device according to a third embodiment of the present invention when the light is emitted from the light emitting unit.

FIG. 21 is cross-sectional view illustrating a structure for a light guide element 20F; and FIG. 22 illustrates a path light travels when the light is emitted from the light emitting unit 13.

The light guide element 20F is provided with an incidence surface 21B as illustrated in FIG. 21, instead of the incidence surface 21 of the first embodiment. The incidence surface 21B has as circular cross section in the XY plane; the center of the cross section is at a different position than the center of the light emitting unit 13. Thus, the incidence surface cause the refraction direction of light to change in accordance with the location when light emitted from the light emitting unit 13 enters the light guide element 20F from the incidence surface 21B. Consequently, the illumination device 2F can thus make use of the light with strong light intensity near the optical axis of the light emitting unit 13 to cause light to exit from each of the light guide elements 20F as illustrated in FIG. 22. Therefore, the illumination device 2F can reduce the non-uniformity in the light intensity distribution of the light emitted from the illumination device 2F (FIG. 15B), similarly to the illumination device 2A of the second embodiment.

The light shield 61 blocks light radiated thereon; the light shield 61 is provided at the upper part of the third connection surface 28 in the light guide element 20F. The light shield 62 blocks light radiated thereon; the light shield 62 is provided between the first reflection surface 23 and the second reflection surface 24 of mutually adjacent light guide elements 20F. The light shield 61 and the light shield 62 blocks the light emitted from the light emitting unit 13 and traveling from the optical axis of the light emitting unit 13 toward the right (i.e., stray light). Thus, stray light, that is, light outside the light that is needed (i.e., light totally reflected by the first reflection surface 23 and the second reflection surface 24) is prevented from exiting via the emission surfaces 22 of the light guide elements 20F.

While the illumination device 2F of this embodiment blocks stray light using the light shield 61 and the light shield 62, an illumination device according to the present invention is not limited to this configuration. For instance, the third reflection surface 25, the first connection surface 26, the second connection surface 27, and the third connection surface 28 may be coated with black paint or may be diffusion surfaces. Hereby, the illumination device can be configured to block or diffuse the light emitted from the light emitting unit 13 toward the right of the optical surface of the light emitting unit 13. In this case, the third reflection surface may block or diffuse high-angle light radiated thereon from the light emitting unit 13; therefore, the third reflection surface may also serve as an optical limiter that restricts the range of incidence angles of light on the first reflection surface.

Overview

A light guide element according to as aspect of the present invention is provided with an incidence surface wherefrom light enters from a light source; a first reflection surface; a second reflection surface; and an emission surface. The first reflection surface totally reflects at least a portion of light incident thereon from the incidence surface; the second reflection surface totally reflects at least a portion of light totally reflected thereto by the first reflection surface as parallel light; and the emission surface emits the parallel light totally reflected thereto by the second reflection surface.

In the above-mentioned configuration, light incident from the incidence surface is totally reflected by the first reflection surface and reflected by the second reflection surface, whereafter, the light is emitted from the emission surface as parallel light. Therefore, there is no need to provide a reflective material such as a vapor deposited metal on the first reflection surface and the second reflection surface. It is therefore possible to reduce the material and manufacturing cost of a light guide element that is for emitting parallel light.

As above described, there may be a need to convert light incident from an incident surface into parallel light with a single total reflection and to emit that light; such configurations require a longer distance from the incidence surface to the emission surface to secure a certain width along the path of the emission light. In contrast, in the above-mentioned configuration light incident from the incidence surface is twice reflected via the first reflection surface and the second reflection surface, whereafter the light is emitted from the emission surface 22 as parallel light. Accordingly, the configuration makes it possible to secure a certain width along the path of mission light while reducing the distance from the incidence surface to the emission surface. Therefore, since it is possible to reduce the size of a light guide element for emitting parallel light, it is also possible to realize an illumination device that is a smaller size.

In one aspect of a light guide element of the present invention, the first reflection surface in the light guide element is a flat surface; and, the second reflection surface is a parabola in a cross section that is in a plane perpendicular to the first reflection surface and parallel to the traveling direction of the parallel light.

With this configuration, the light emitting unit may be arranged such that the location of the plane of symmetry between the light emitting unit and the first reflection surface is the location of the focal line of the parabolic shape of the second reflection surface. Hereby, light reflected by the second reflection surface is converted to parallel light.

A light guide element according to an aspect of the present invention may further include an optical limiter configured to limit the range of incidence angles of light on the first reflection surface for light emitted from the light source and arriving directly at the first reflection surface via the incidence surface.

Light from the emitting unit is typically diffused, where the amount of light decreases with distance from the optical axis. In contrast, since the above-mentioned configuration limits the range of incidence angles on the first reflection surface, it is possible reduce the non-uniformity in the light intensity along the path of the light incident on the first reflection surface 23. Therefore, this reduces the variations in the light intensity generated depending on the location for the parallel light finally emitted from the emission surface.

A light guide element according to an aspect of the invention further includes a stray light suppressor configured to prevent light from the light source that does not travel via the first reflection surface from irradiating at least any one of the second reflection surface and the emission surface.

The above mentioned configuration thus prevents emission of stray light, which is not the parallel light appropriately reflected by the first reflection surface and the second reflection surface, from the emission surface.

A light guide element according to an aspect of the present invention may include an optical shape provided on the incidence surface, the optical shape configured to change the refraction direction of light in accordance with the location when light from the light source enters from the incidence surface.

Light from the emitting unit is typically diffused, where the amount of light decreases with distance from the optical axis. In contrast, with the above configuration the optical shapes prevent a reduction in the light intensity; therefore, it is possible to reduce the variations in light intensity generated depending on the location for the parallel light finally emitted from the emission surface 22.

A light guide element according to an aspect of the present invention may be partitioned into a first component including the first reflection surface and a second component including the second reflection surface.

This configuration allows the light guide element to be partitioned into a first component and a second component. Therefore, the first component and the second component may be produced separately when producing the light guide element via die-casting. As a result, the first component or the second component may be produced by sliding only a single die block; therefore, this increases the number of castings that can be taken from a single die. Consequently, the light guide element may be produced at less cost.

In a light guide element according to an aspect of the invention, given a tangent to the end of the second reflection surface opposite the emission surface, the slope of the tangent to relative to the emission surface is greater than or equal to the slope of the first reflection surface relative to the emission surface in a plane perpendicular to the first reflection surface and parallel to the traveling direction of the parallel light.

With this configuration, a plurality of light guide elements may be aligned perpendicular to the thickness of the light guide elements with the emission surfaces mutually adjacent in the same plane.

A light guide unit according to an aspect of the present invention is provided with a plurality of the above light guide elements, where the emission surface of each light guide element is mutually adjacent along the same plane.

Since each light guide element is provided with a light source in above configuration, arranging the light guide elements along the thickness of the light guide elements increases the intensity of the light irradiated. Arranging the light guide elements in a direction perpendicularly to the thickness of the light guide elements increases the surface area of parallel light that is emitted.

In a light guide unit according to one aspect of the present invention, the emission surface of the light guide elements are aligned in one direction in the same plane.

In a light guide unit according to an aspect of the present invention, the emission surfaces of mutually adjacent light guide elements overlap each other in a direction perpendicular to the one direction.

The above configuration consequently suppresses the generation of a dark line in a distribution of light emitted from the light guide unit.

In a light guide unit according to an aspect of the present invention, the emission surfaces in the light guide elements are parallelograms.

The above configuration allows the light guide element to be aligned so that the emission surfaces of mutually adjacent light guide elements overlap each other in a direction perpendicular to the one direction.

An illumination device according to an aspect of the present invention is provided with the above light guide unit and a plurality of light sources. The above-mentioned configuration allows for a smaller illumination device that can be produced at low cost since the light guide unit is configured from light guide elements according to aspects of the present invention.

An illumination device according to an aspect of the present invention may be configured so that the plurality of light sources may be mounted on the same substrate.

The above configuration allows for a simpler illumination device, and increases the ease of assembly, since the plurality of light sources can be mounted on a single substrate.

In an illumination device according to an aspect of the present invention, the light sources may be provided with a plurality of light emitting elements with the light emitting elements aligned along the thickness of the light guide element. This increases the degree to which light emitted from the emission surface is parallel.

In an illumination device according to an aspect of the present invention, the plurality of light emitting elements may emit light of mutually different colors. Thus, this configuration makes it possible to adjust the intensity of light emitted from the light emitting elements, whereby light of various colors may be emitted.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A light guide element comprising:
    an incidence surface wherefrom light from a light source enters;
    a first reflection surface configured to totally reflect, without using a reflective coating, at least a portion of the light entering from the incidence surface;
    a second reflection surface configured to totally reflect, without using a reflective coating, at least a portion of the light totally reflected by the first reflection surface as parallel light;
    an emission surface configured to emit the parallel light totally reflected by the second reflection surface; and
    an optical limiter configured to limit the range of incidence angles of light on the first reflection surface for light emitted from the light source and arriving directly at the first reflection surface via the incidence surface.

2. The light guide element according to claim 1,
    wherein the first reflection surface is a flat surface; and
    wherein the second reflection surface is a parabola in a cross section that is in a plane perpendicular to the first reflection surface and parallel to the traveling direction of the parallel light.

3. The light guide element according to claim 1, further comprising:
    a stray light suppressor configured to prevent light from the light source that does not travel via the first reflection surface from irradiating at least any one of the second reflection surface and the emission surface.

4. The light guide element according to claim 1, wherein an optical shape is provided on the incidence surface, the optical shape configured to change the refraction direction of light in accordance with the location when light from the light source enters from the incidence surface.

5. The light guide element according to claim 1, wherein the light guide element is partitioned into a first component including the first reflection surface and a second component including the second reflection surface.

6. The light guide element according to claim 2, wherein given a tangent to the end of the second reflection surface opposite the emission surface, the slope of the tangent to relative to the emission surface is greater than or equal to the slope of the first reflection surface relative to the emission surface in a plane perpendicular to the first reflection surface and parallel to the traveling direction of the parallel light.

7. A light guide unit comprising:
    a plurality of light guide elements according to claim 1,
    wherein the emission surfaces of the light guide elements are mutually adjacent in the same plane.

8. The light guide unit according to claim 7, wherein the emission surfaces of the light guide elements are aligned in one direction in the same plane.

9. The light guide unit according to claim 8, wherein the emission surfaces of mutually adjacent light guide elements overlap each other in a direction perpendicular to the one direction.

10. The light guide unit according to claim 9, wherein the emission surfaces of the light guide elements are parallelograms.

11. An illumination device comprising:
    a light guide unit according to claim 7; and
    a plurality of light sources.

12. The illumination device according to claim 11, wherein the plurality of light sources is mounted on the same substrate.

13. The illumination device according to claim 11,
    wherein each of the light sources include a plurality of light emitting elements; and
    wherein the plurality of light emitting elements is aligned along a thickness of the light guide element.

14. The illumination device according to claim 13, wherein the plurality of light emitting elements emits light of mutually different colors.

15. The light guide element according to claim 2, further comprising:
    a stray light suppressor configured to prevent light from the light source that does not travel via the first reflection surface from irradiating at least any one of the second reflection surface and the emission surface.

16. The light guide element according to claim 1, further comprising:
a stray light suppressor configured to prevent light from the light source that does not travel via the first reflection surface from irradiating at least any one of the second reflection surface and the emission surface.

17. The light guide element according to claim 2, wherein an optical shape is provided on the incidence surface, the optical shape configured to change the refraction direction of light in accordance with the location when light from the light source enters from the incidence surface.

18. The light guide element according to claim 1, wherein an optical shape is provided on the incidence surface, the optical shape configured to change the refraction direction of light in accordance with the location when light from the light source enters from the incidence surface.

* * * * *